(12) United States Patent
Pfanzer

(10) Patent No.: US 6,520,038 B1
(45) Date of Patent: Feb. 18, 2003

(54) DRIVE DEVICE, FOR A MOVABLE PART, IN PARTICULAR A HINGED SIDE WINDOW OF A VEHICLE

(75) Inventor: Gerhard Pfanzer, Bad Camberg (DE)

(73) Assignee: Mannesmann VDO AG, Frankfurt (DE)

( * ) Notice: Subject to any disclaimer, the term of this patent is extended or adjusted under 35 U.S.C. 154(b) by 0 days.

(21) Appl. No.: 09/425,845

(22) Filed: Oct. 21, 1999

(30) Foreign Application Priority Data

Oct. 26, 1998 (DE) .......................................... 198 49 245

(51) Int. Cl.⁷ ............................ F16H 25/20; E05F 15/12
(52) U.S. Cl. ...................... 74/89.42; 74/424.75; 49/324; 403/130
(58) Field of Search ........................ 74/89.42, 424.75, 74/424.76, 409, 441, 458, 424.74; 403/122, 128, 129, 130, 132, 133; 49/324, 349, 325, 362

(56) References Cited

U.S. PATENT DOCUMENTS

| | | | |
|---|---|---|---|
| 2,493,000 A | | 1/1950 | Linsley |
| 2,936,645 A | * | 5/1960 | Morris et al. .................. 74/441 |
| 3,190,132 A | * | 6/1965 | Lyon, Jr. ...................... 74/441 |
| 3,843,272 A | * | 10/1974 | Jorn ........................... 403/132 |
| 3,847,490 A | | 11/1974 | Uchida |
| 4,186,524 A | | 2/1980 | Pelchat |
| 4,555,198 A | * | 11/1985 | Wenning et al. ............. 403/130 |
| 4,722,631 A | | 2/1988 | Tagami |
| 4,871,246 A | * | 10/1989 | Manzoni ..................... 74/89.23 |
| 5,163,732 A | | 11/1992 | Schurmann |
| 5,239,882 A | * | 8/1993 | Druet .......................... 74/441 |
| 5,372,446 A | | 12/1994 | Chamberlin |
| 5,528,951 A | | 6/1996 | Takahashi et al. |

FOREIGN PATENT DOCUMENTS

| | | |
|---|---|---|
| DE | 3015528 | 10/1981 |
| DE | 4317956 | 12/1992 |
| DE | 29708162 | 7/1997 |
| EP | 0517561 | 12/1992 |
| EP | 0694714 | 1/1996 |
| GB | 1401786 | 7/1975 |
| JP | 62-251515 A | * 11/1987 |

* cited by examiner

Primary Examiner—William C Joyce
(74) Attorney, Agent, or Firm—Martin A. Farber

(57) ABSTRACT

A drive device for a moveable part, in particular a hinged side window of a vehicle, with an actuating drive and with a threaded piece which is driven by the actuating drive and which meshes with an associated threaded piece, the associated threaded piece moving the part, there being provision, in order to reduce undesirable noises, for individual flights of at least one threaded piece (14) to be designed in such a way that they come to bear under the effective force in the respectively associated flights of the other threaded piece.

13 Claims, 5 Drawing Sheets

DRIVE DEVICE, FOR A MOVABLE PART, IN PARTICULAR A HINGED SIDE WINDOW OF A VEHICLE

FIELD AND BACKGROUND OF THE INVENTION

The invention relates to a drive device, for a movable part, in particular a hinged side window of a vehicle, with an actuating drive which is connected to the movable part via connecting elements.

U.S. Pat. No. 4,186,524 discloses a drive device for a hinged side window of a vehicle. This hinged side window is arranged in an articulated manner on a chassis (for example, the B-pillar) of the vehicle and can be brought by an actuating drive out of its closed position into the open position and back again or into intermediate positions.

SUMMARY OF THE INVENTION

The actuating drive is designed as an electric motor which acts on the threaded rod via gearwheels, the threaded rod being connected to a Bowden cable. As a result of the rotation of the threaded rod, the Bowden cable is moved linearly and thus causes the hinged side window to be opened or closed.

The disadvantage of this arrangement is that it is complicated, since the actuating drive has to be arranged in a region which is far removed from the point at which the connecting element engages on the hinged side window. This results in a high outlay in terms of assembly.

It would be conceivable, then, to shift the actuating drive directly into the region in which the connecting element is fastened to the hinged side window. Here too, however, just as in the embodiment according to U.S. Pat. No. 4,186,524, there is the problem that drive devices produced in large series and therefore having tolerances generate noise, particularly when the hinged side window is opened, since the connecting element is fastened to the hinged side window via a ball joint, in order to make it possible for the end of the connecting element to follow an arcuate path of movement. Since such a ball joint and also the connecting element are subject to tolerances, wind flows and vehicle vibrations also result in noise-generating oscillations of the hinged side window which are transmitted to the drive device, generate noises there and are disturbing to the vehicle occupants. Such noises are disturbing particularly because they occur in a region where the occupant's head is located.

The object on which the invention is based is, therefore, to improve the drive device for a movable part, in particular a hinged side window of a vehicle, in such a way that oscillations of the components involved are largely prevented or ruled out completely.

According to the invention, provision is made for designing individual flights of at least one threaded piece in such a way that they come to bear under the effective force in the respectively associated flights of the other threaded piece. Individual threaded pieces are usually produced from plastic by the injection molding method, this method being subject to certain tolerances. The invention now makes use of the fact that individual flights of one threaded piece are designed, for example, to be thicker than the remaining flights, whilst the flights of the other threaded piece have a uniform shape and uniform dimensions. What is achieved thereby is that the thicker individual flights come to bear under the effective force in the respectively associated flights of the other threaded piece, so that the tolerances occurring during production are therefore compensated and sluggishness which is still permitted, and which can be overcome easily by the actuating drive, is taken into account, in order thereby effectively to prevent the tendency to oscillation. Advantageously, not all the flights of the threaded piece are designed, for example, to be thicker, since inadmissible and also unnecessary sluggishness would be obtained as a result. It is therefore sufficient that only individual flights (such as, for example, every second or every fifth flight and so on) may be designed differently from the remaining flights. It is important that there is always at least one flight (spindle tooth) in the thread.

In a development of the invention, individual flights are designed to be curved in the circumferential direction with respect to the remaining flights. In this case, the curve may be a simple curve, but also an extremely elongated S-curve, so that the flanks of the individual flights come to bear partially, under the effective force, on the flights of the associated threaded piece. Again, by this means too, the necessary slight sluggishness is achieved, so that tolerances can be compensated.

In a development of the invention, individual flights at least partially have a slot in the circumferential direction. These individual flights are then, again, designed to be thicker than the remaining flights, some resilience being achieved by means of the slot, since the flanks of a flight which are separated from one another by the slot press against the flight of the associated threaded piece.

In a further refinement of the invention, individual flights are arranged in a position deviating from the position predetermined by the associated threaded piece. This offset out of the desired position in the circumferential direction likewise causes a flank of a flight to press against the flank of the flight of the associated threaded piece, so that, here too, the effect that tolerances are compensated is achieved again.

It goes without saying that, where the threaded piece is concerned, the measures described can be taken individually or in combination with one another.

In a particularly advantageous way, a measure or a combination of measures is used in the case of a threaded piece which is designed as an external thread, since an external thread is produced in the injection molding method by means of a mold composed of two assembled and reseparable molds, whereas an internal thread is produced with a mold having an external thread, this core in the mold with an internal thread being turned out after the production process. If, however, the threaded piece with the internal thread is also produced from two or more mold halves which can be separated after production, the measures described are also used where this threaded piece is concerned.

Furthermore, as an additional measure for reducing undesirable noises, there is provision for a ball head mounted in a ball socket of the ball joint or for the ball socket to be provided with elastically resilient means. As a rule, the ball joint consists of plastic which is produced, for example, by the injection molding method. In this case, tolerances occur, so that the ball head mounted in the ball socket can still move with some play relative to the ball socket on account of these tolerances. These tolerances are eliminated by the elastically resilient means in a way according to the invention, so that, although the ball head can still move (if appropriate, somewhat sluggishly) in the ball socket, a positive connection has been made, so that there is no longer any space available for oscillations. Moreover, solid-borne sound from the actuating drive (motor noise) is thereby prevented from being transmitted to the hinged side window. Consequently, the source of origin of the disturbing oscillations described and therefore of the resulting generation of noise is eliminated. Also, these oscillations can no longer be transmitted in the direction of the actuating drive, so that the components involved here are likewise not excited to oscillate, with the result that the noise level is further reduced or noises are no longer generated at all and wear is markedly reduced.

In a development of the invention, the ball head has at least one peripheral groove which receives a rubber ring. Such a ball head can therefore be produced in a simple way, the peripheral groove either being introduced as early as during the production process or being introduced after the ball head has been produced. The rubber ring is, for example, a so-called O-ring which is available, cost-effectively and in a multiplicity of different dimensions (diameters and thicknesses). The drive device according to the invention can therefore also be produced cost-effectively.

In a development of the invention, the ball head has two parallel grooves which are arranged out of center and in each of which a rubber ring is inserted. Since there are therefore two peripheral faces available, with which the surface of the rubber ring can bear on the inner face of the ball socket, this ensures that, during every movement, always at least one surface of a rubber ring bears on the inner face of the ball socket and disturbing noises are therefore effectively avoided. This is necessary, in particular, when the ball joint executes a curved movement on its path of movement. A web occurring between the grooves serves for the transmission of force during tension and compression movements. The ball head may also consist of two ball head halves provided correspondingly with a groove. When the rubber rings are pressed together during tension and compression movements, the surfaces of the ball head halves serve for the transmission of force and come to bear positively on the ball socket.

In a development of the invention, the ball head is covered at least partially with an elastically resilient layer. Such an elastically resilient layer may be drawn on over the ball head, for example after it has been produced, and it is also conceivable for the ball head, by being dipped into an appropriate liquid, to be covered with such a layer which subsequently changes to a solid state. Such a layer also ensures that the tolerance between the ball socket and the ball head of the ball joint is eliminated.

The same effect is obtained even if or if only the ball socket is covered at least partially on its inside with an elastically resilient layer. It may also be mentioned that it is also conceivable for the inside of the ball socket to be provided with at least one peripheral groove, into which a rubber ring is inserted in each case, although it is expedient for these measures to be carried out only as far as the ball head is concerned, since the production and assembly operation is simpler in this case.

In a development of the invention, the ball joint is arranged between the connecting element and the movable part. The connecting element is, for example, the already known Bowden cable or a connecting rod or, if appropriate, a combination of the two elements mentioned. Since the hinged side window is arranged in an articulated manner on the chassis and the ball joint is arranged at a distance from this point of articulation, when the hinged side window is being moved from the close position into the open position the ball joint follows an approximately curved path which, by virtue of the ball joint, become possible even though the connecting element executes an essentially linear movement. That is to say, the end of the connecting element (connecting rod) describes a linear path of movement which is converted via the ball joint into a curved path of movement.

The same effect is obtained when the ball joint is arranged between the connecting element and the actuating drive. Depending on the length of the path of movement to be described, it is advantageous if a ball joint is arranged at both ends of the connecting element (connecting rod). Any desired path of movement and any length of the desired path of movement can consequently be implemented without difficulty. It goes without saying that the two ball joints at the respective end of the connecting element are provided with the elastically resilient means, as described above.

BRIEF DESCRIPTION OF THE DRAWINGS

The drive device according to the invention is described below with reference to an exemplary embodiment and explained with reference to the figures, of the the accompanying drawings concept of the invention not being restricted to this exemplary embodiment.

Of the figures of the drawings

DETAILED DESCRIPTION OF THE PREFERRED EMBODIMENT

Figure 1:
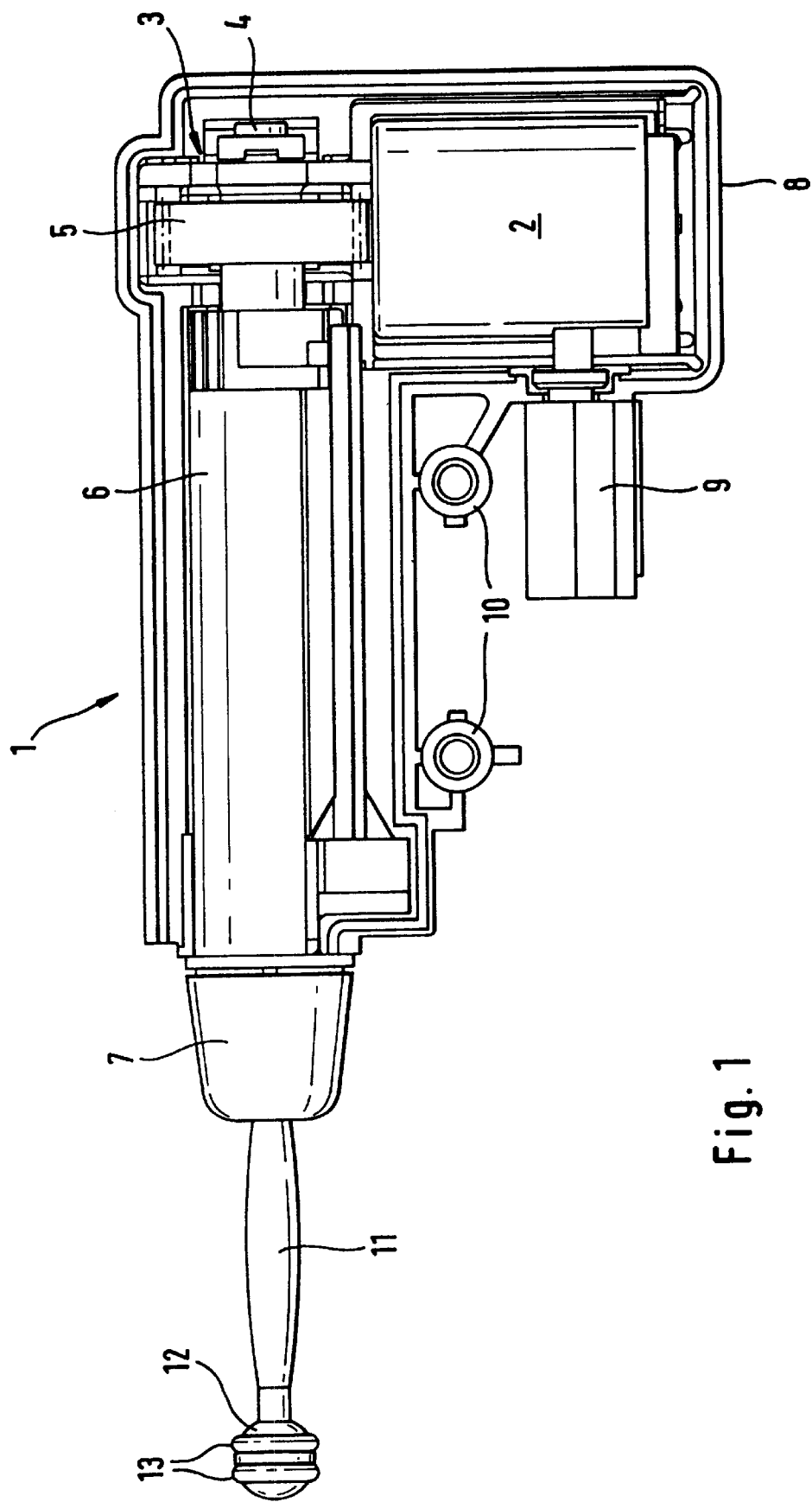
FIG. 1: shows a hinged window drive.

FIG. 1 shows a hinged window drive 1 which is designed as a so-called linear drive. The hinged window drive 1 has, as actuating drive, an electric motor 2 which drives a drive shaft 4 via a reduction gear 3. This drive shaft 4 has a gearwheel 5 with an external toothing, the gearwheel 5 being driven by a worm wheel, not shown, arranged on the motor shaft of the electric motor 2. The drive shaft 4, which has an external thread (see also FIG. 2), extends longitudinally within a drive tube 6, the drive tube 6 being provided with an internal thread corresponding to the external thread of the drive shaft 4. Although mountings for the drive shaft 4 and the drive tube 6 are present, they are not shown for the sake of greater clarity.

That end of the drive tube 6 which faces away from the gearwheel 5 opens into a cover 7 which is firmly connected or connectable to the drive tube 6. The design of this end of the drive tube 6 is dealt with again in connection with FIG. 5.

The hinged window drive 1 has, furthermore, a housing 8, in which the drive elements are accommodated. The housing 8 may be provided with an insulating layer, in particular on the inside, for the purpose of noise reduction. A plug 9, via which the electric motor 2 is activated, is located on the housing 8 or is produced in one piece with the latter. If appropriate, position signals are also transmitted via this plug 9. There are fastening means 10, by which the hinged window drive 1 can be fastened to part of the vehicle. The arrangement and design of the fastening means 10 depend on the installation space for the hinged window drive 1 which can thus easily be installed as a module and put into operation via the plug 9.

A connecting rod 11 projects out of the cover 7, that end of the connecting rod 11 which faces away from the cover 7 having a ball head 12. The connecting rod 11 and the ball head 12 are advantageously produced as a one-piece lathe-turned part (for example, aluminum) or as a plastic part, but may also form two components, for which purpose the ball head 12 is then connected to the connecting rod 11 (for example, by adhesive bonding or snapping). Advantageously, the other end of the connecting rod 11 is also connected to a ball head within the cover 7.

The ball head 12 shown in FIG. 1 has two rubber rings 13 which are arranged out of center and which are inserted into grooves.

Figure 2A:
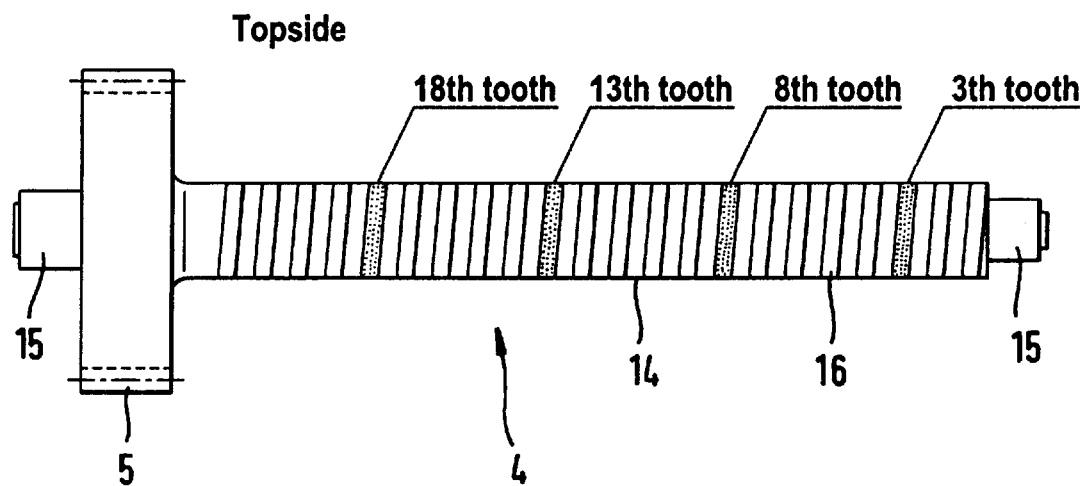
FIG. 2: includes FIGS. 2A and 2B showing detailed views of a drive shaft.
Figure 2B:
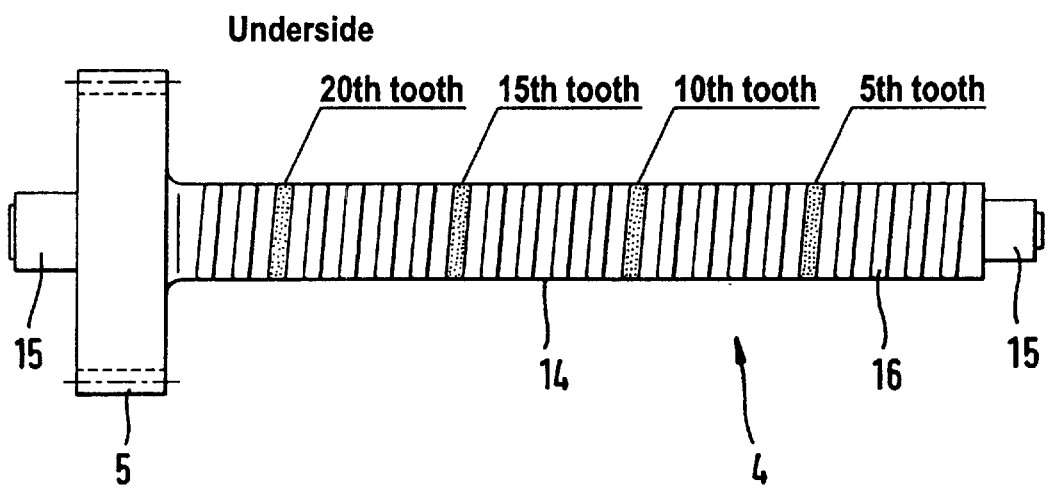

FIG. 2 shows detailed views of the drive shaft 4. This has a longitudinally extending threaded piece 14 which is designed as an external thread. At the ends of the drive shaft 4 there are bearing ends 15, by means of which the drive shaft 4 is mounted, for example, in the housing 8 or in the drive tube 6. The threaded piece 14 has teeth 16 which form the external thread. The filled-in flights of the (for example) third, eighth, thirteenth and eighteenth tooth indicate that these teeth are designed to be thicker on the topside, that is to say over the half circumference of the threaded piece 14, than the remaining teeth 16. Exactly the same situation occurs on the underside of the drive shaft 4, with the fifth, tenth, fifteenth and twentieth tooth, which are likewise designed to be thicker over half the overall circumference of the threaded piece 14, the thicker teeth on the topside being arranged approximately centrally (as seen in the longitudinal direction) between the thicker teeth on the underside, or vice versa.

This essentially symmetric arrangement ensures, when the drive shaft 4 is rotated, that the latter moves somewhat sluggishly in the drive tube 6 and there is always a non-positive connection between the drive shaft 4 and the drive tube 6, so that longitudinal movement of the drive tube 6 or of the drive shaft 4 in the longitudinal direction as a result of tolerances is not possible. The thickening is selected such as to achieve a sluggishness which is just necessary and can easily be overcome by the electric motor 2, but which is not so great that the individual teeth would be subject to needless wear. It is therefore conceivable, at this point, for lubricants specially suitable for plastic to be introduced between the flights.

In addition to the particular design of the drive shaft 4, the surface of the drive tube 6 may also be provided with elastically resilient means (for example, a felt which is glued on), in order to compensate tolerances between the drive tube 6 and the housing 8 during a longitudinal movement of the drive tube 6.

Figure 3:
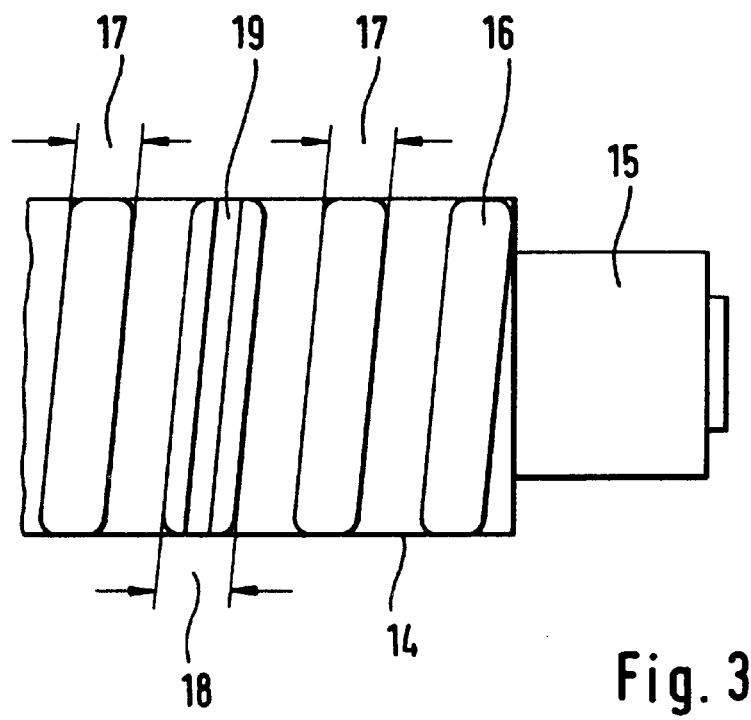
FIGS. 3 & 4: show various tooth shapes.

FIG. 3 shows that the teeth 16 have a thickness (width) which is given the reference numeral 17. At least one of the teeth, which is designed to be thicker than the remaining teeth (this width is given the reference numeral 18 here), has a slot 19, and this slot 19 can be pressed together in interaction with the flights of the drive tube 6, so that, by virtue of this spring-like action, tolerances are compensated and oscillations avoided.

Figure 4:
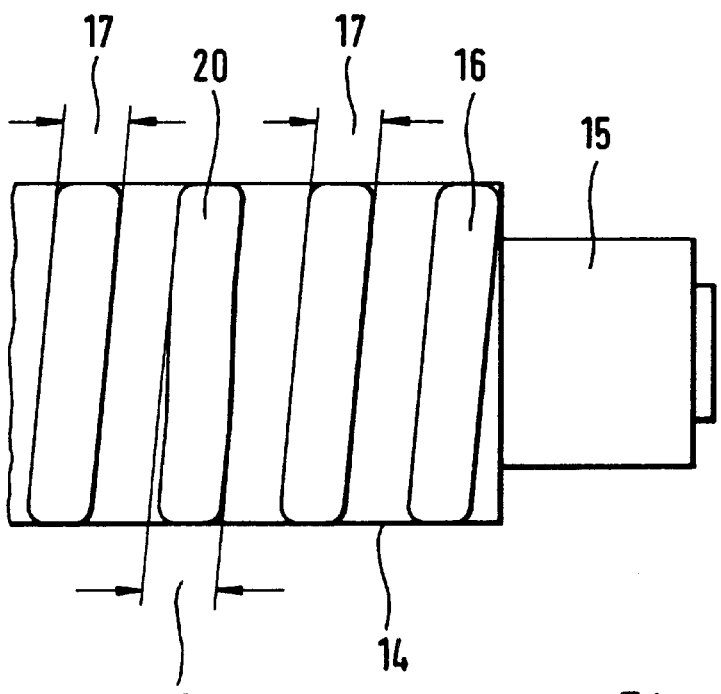

FIG. 4 shows that a tooth 20, in particular a tooth thicker than the other teeth, is designed asymmetrically, in particular with a curved shape. Thus, only part flanks of the asymmetrical, in particular thicker tooth come into contact with the associated flights of the drive tube 6, with the result that a force effect is also achieved.

Figure 5:
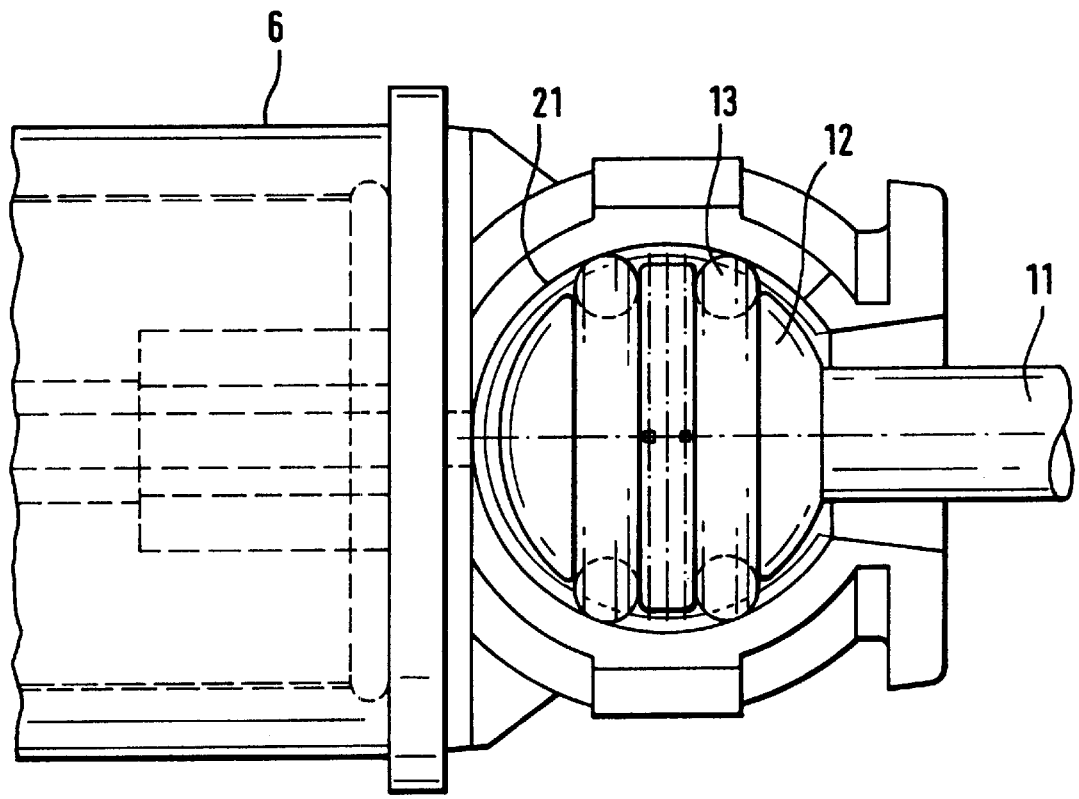
FIG. 5: shows one end of a drive tube with a mounted connecting rod and without a cover.

FIG. 5 shows one end of the drive tube 6 with a mounted connecting rod 11 and without the cover 7 attached. This cover 7 constitutes essentially a protective cover, in order to prevent the ball joint arranged under it and also the insides of the hinged window drive 1 from being soiled. It is possible in exactly the same way to cover the ball joint, the ball head 12 of which is illustrated in FIG. 1, with a correspondingly designed cover. The one end of the drive tube 6 has projections, not designated in any more detail, which, after the cover 7 has been attached, engage into its corresponding depressions (or conversely: projections on the cover 7 and corresponding depressions on the one end of the drive tube 6), so that the cover 7 is thereby secured to the one end of the drive tube 6 by means of a positive connection.

A ball socket 21 is provided for the ball head 12 at this one end of the drive tube 6. Alternatively, part of the drive tube 6, together with part of the cover 7, or the cover 7 alone may also form the ball socket 21, so that, after the ball head 12 has been inserted into the part of the ball socket 21 of the drive tube 6, the cover 7 is slipped over and the connecting rod 11 is consequently fixed movably. The same operation can be carried out on the other side of the connecting rod 11, part of the ball socket being fastened to the hinged side window, not shown, and a corresponding cover being pushed over the ball head 12 of FIG. 1. This is carried out preferably before the hinged window drive 1 is mounted at a fixed location, so that the drive tube 6 is brought into a position which corresponds to the closed position of the hinged side window; subsequently, the outer ball head 12, together with the ball socket, is connected to the hinged side window via the cover, and only then is the housing 8 of the hinged window drive 1 fastened to the body or another part of the vehicle by the fastening means 10. After the electric motor 2 has been activated, the hinged side window can then be brought from its closed position into an opened position or intermediate position, the fully opened position being detected by the blocking of the electric motor 2 or by a limit switch which is preferably integrated in the housing 8 and as a function of which the supply of current to the electric motor 2 is switched off.

Figure 6:
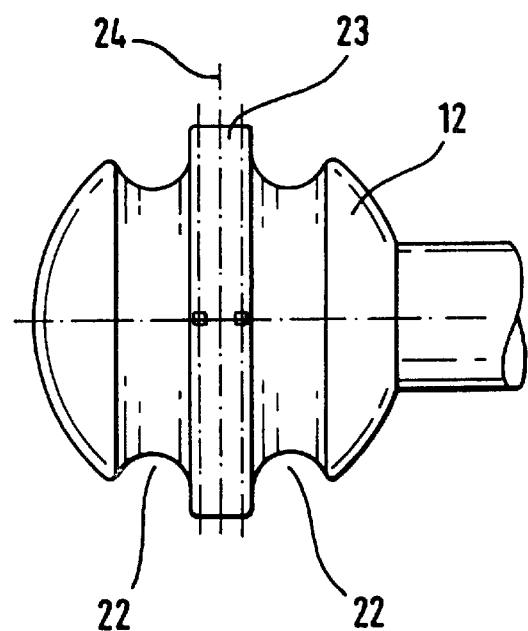
FIG. 6: shows a detailed view of a ball joint.

FIG. 6 shows a section through a ball head 12, in which it can be seen how two grooves 22 are arranged out of center in the form of a flute, so as to extend over the circumference of the ball head 12, for the purpose of receiving the rubber rings 13. The use of two grooves 22 and two corresponding inserted rubber rings 13 is necessary in order to ensure that always at least one surface of a rubber ring 13 remains connected to the corresponding inner face, not shown here, of the ball socket, which, in particular, is an integral part of the cover 7, and, by means of the web 23 occurring between the two grooves 14, forces are transmitted from the connecting rod 11 to the ball socket, not shown, which is fastened to the hinged side window, since high tensile forces are to be exerted precisely when the hinged side window is moved from its open position into its closed position. The center point of the ball head 12 (or of the two ball head halves) does not have to be located at the point of intersection of the horizontal broken line, shown in FIG. 6, and of the center line 24 of the web 23, but may deviate from this. Thus, for example (looking at FIG. 6), the center point of the left half of the ball head 12 may be located in the right small square and the center point of the right half of the ball head 12 in the left small square. Alternatively, for example (looking at FIG. 6) the center point of the left half of the ball head 12 may be located in the left small square and the center point of the right half of the ball head 12 in the right small square.

Figure 7:
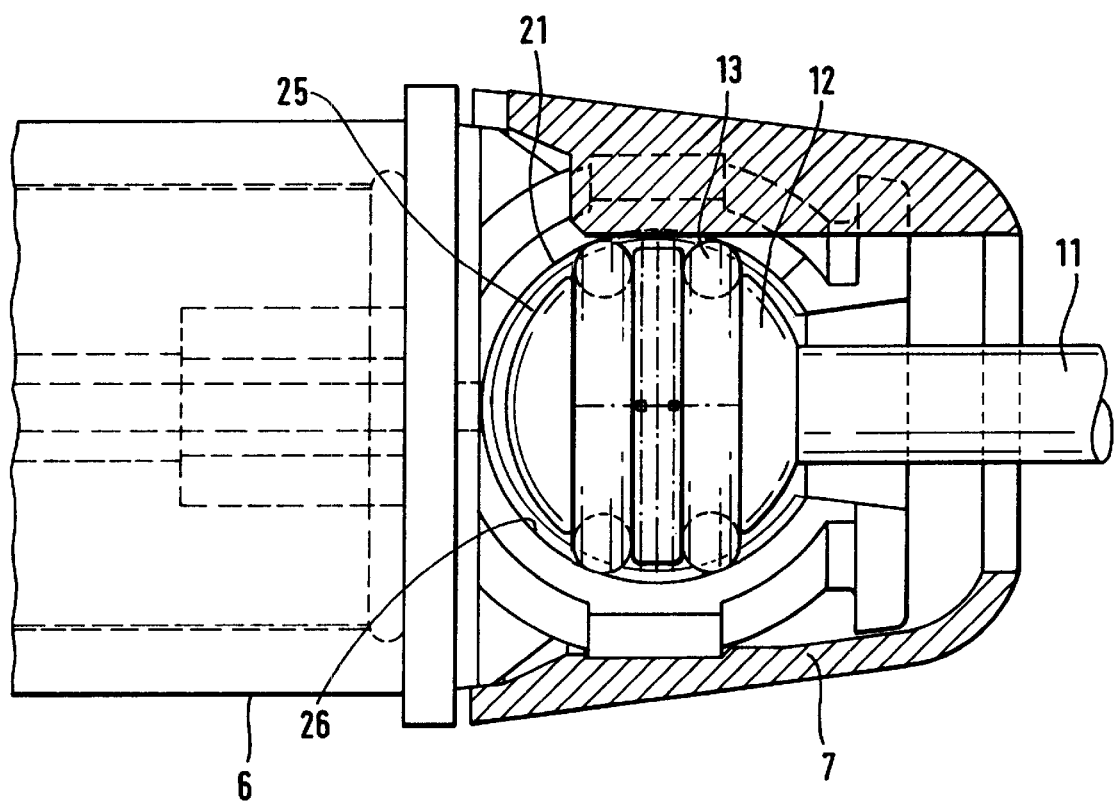
FIG. 7: shows one end of a drive tube with a mounted connecting rod and cover.

FIG. 7 shows one end of the drive tube 6 with a mounted connecting rod 11 and with an attached cover 7. By way of alternative embodiments, the ball head 12 may be covered at least partially with an elastically resilient layer 25. Also, the ball socket 21 may be covered at least partially on its inside with an elastically resilient layer 26.

List of Reference Symbols

1. Hinged window drive
2. Electric motor
3. Reduction gear
4. Drive shaft (with external thread)
5. Gearwheel
6. Drive tube (with internal thread)
7. Cover
8. Housing
9. Plug
10. Fastening means
11. Connecting rod
12. Ball head
13. Rubber ring
14. Threaded piece
15. Bearing end
16. Teeth
17. Width
18. Larger width
19. Slot
20. A tooth
21. Ball socket
22. Grooves
23. Web
24. Center line

I claim:

1. A drive device for a hinged side window of a vehicle, with an actuating drive and with a first threaded piece having first flights which is driven by the actuating drive and which is in contact with and meshes with an associated second threaded piece having second flights, the associated second threaded piece moving the side window, individual flights of the first or the second flights of at least one of said threaded pieces come to bear under an effective force with respective associated flights of said other threaded pieces, said individual flights are designed to be thicker than other flights of the first flights or respectively of the second flights, so that the flanks of said individual flights directly contact and come to bear partially, under the effective force, on the flights of the associated threaded piece.

2. The drive device as claimed in claim 1, wherein individual flights at least partially have a slot in the circumferential direction.

3. The drive device as claimed in claim 1, wherein individual flights are arranged in a position deviating from the position predetermined by the associated threaded piece.

4. The drive device as claimed in claim 1, wherein the actuating drive is connected to the window via at least one connecting element and a ball joint, wherein a ball head (12) mounted in a ball socket of the ball joint or the ball socket includes an elastically resilient element which contacts the socket.

5. The drive device as claimed in claim 4, wherein the ball head (12) is covered at least partially with an elastically resilient layer.

6. The drive device as claimed in claim 4, wherein the ball socket is covered at least partially on its inside with an elastically resilient layer.

7. The drive device as claimed in claim 4, wherein the ball joint is arranged between the connecting element and the window.

8. The drive device as claimed in claim 7, wherein the ball element is arranged between the connecting element and the actuating drive.

9. The drive device as claimed in claim 4, wherein the ball element is arranged between the connecting element and the actuating drive.

10. The drive device as claimed in claim 1, wherein the drive is designed as a linear drive.

11. A drive device for a hinged side window of a vehicle, with an actuating drive and with a first threaded piece having first flights which is driven by the actuating drive and which is in direct contact with and meshes with an associated second threaded piece having second flights, the associated second threaded piece moving the side window, individual flights of the first or the second flights of at least one of said threaded pieces directly contact and come to bear under an effective force with respective associated flights of said other threaded pieces, said individual flights are thicker than other flights of the first flights or respectively of the second flights.

12. A drive device for a hinged side window of a vehicle, with an actuating drive and with a threaded piece which is driven by the actuating drive and which is in contact with and meshes with an associated threaded piece, the associated threaded piece moving the side window, wherein individual flights are thicker than remaining flights of one of said threaded pieces and directly contact and come to bear under an effective force with respective associated flights of the other of said threaded pieces, the actuating drive is connected to the window via at least one connecting element and a ball joint, a ball head (12) is mounted in a ball socket of the ball joint or the ball socket and includes an elastically resilient element, and the ball head (12) has at least one peripheral groove which receives a rubber ring (13).

13. A drive device for a hinged side window of a vehicle, with an actuating drive and with a threaded piece which is driven by the actuating drive and which meshes with an associated threaded piece, the associated threaded piece moving the side window, wherein individual flights are thicker than remaining flights of one of said threaded pieces so as to bear under an effective force with respective associated flights of the other of said threaded pieces, the actuating drive is connected to the window via at least one connecting element and a ball joint, a ball head (12) is mounted in a ball socket of the ball joint or the ball socket and includes an elastically resilient element, and the ball head (12) has two parallel grooves (22) which are displaced at different distances from a center of the ball head and into each of which a rubber ring (13) is inserted.

* * * * *